April 10, 1956  A. G. TAYLOR  2,741,338
SELF-ADJUSTING MECHANISM FOR HYDRAULIC WHEEL BRAKES
Filed April 27, 1954
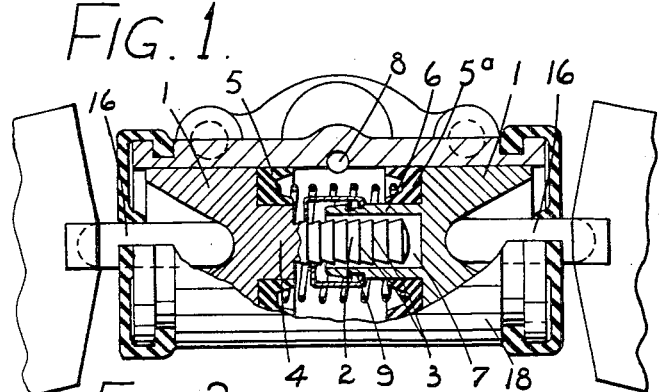
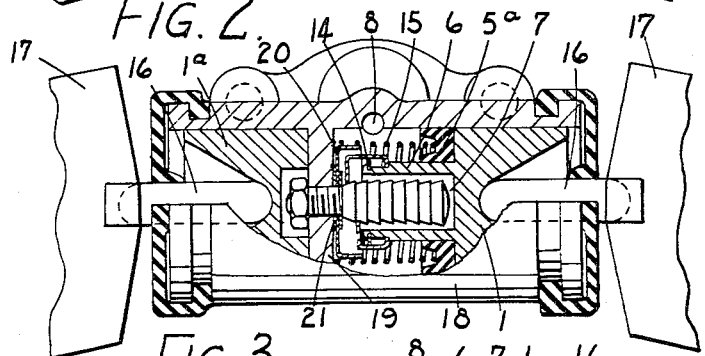
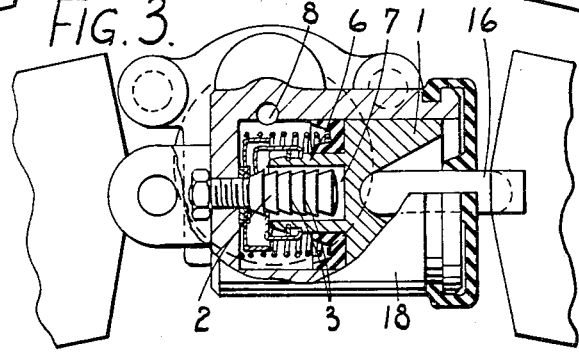
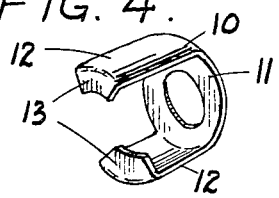
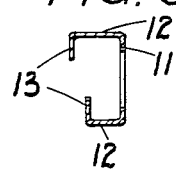
INVENTOR
Arthur George Taylor
PER
Richardson, David and Norton
his ATTORNEYS.

United States Patent Office 2,741,338
Patented Apr. 10, 1956

2,741,338

SELF-ADJUSTING MECHANISM FOR HYDRAULIC WHEEL BRAKES

Arthur G. Taylor, Davidstow, Camelford, England, assignor to H. & T. Industries Limited, Launceston, Cornwall, England Application April 27, 1954, Serial No. 425,943

Claims priority, application Great Britain May 7, 1953

2 Claims. (Cl. 188—196)

This invention relates to hydraulic brake actuating mechanism for vehicles, the actuating mechanism taking the form of a unit consisting of a cylinder containing one or more pistons operating directly or indirectly on the brake shoe or shoes, the cylinder having a connection for the supply of hydraulic fluid which applies pressure to the piston or pistons to move the latter outwardly in opposite directions to bring the brake shoes into contact with their associated drum.

It will be appreciated, therefore, that in its simplest form the cylinder will contain a single piston in which case the cylinder may be fixed as in the case of a construction involving two opposed pistons or mounted for axial movement. In the former case two units will be provided per wheel each of which operates a brake shoe by means of its associated piston and in the second construction the piston will operate one shoe and the cylinder the other.

The chief object of the invention is to evolve an improved piston assembly for such mechanism which can be substituted for the piston assemblies of existing mechanisms and which will provide automatic compensation or wear in the linings without risk of loss of hydraulic fluid, a further object being to provide a construction in which hydraulic pressure will be applied over the whole effective area of the piston or pistons.

Although primarily intended for replacement purposes the invention can be employed in the manufacture of the complete unit including the cylinder. The invention in its broadest aspect consists of a piston assembly including two opposed pistons or a single piston having a limited free axial movement, relative to one another in the case of two pistons, or in the case of a single piston relative to the cylinder, said pistons being interconnected, or in the case of a single piston, connected with its associated cylinder, through the medium of pawl and ratchet or equivalent mechanism for taking up excessive free movement of the piston or pistons in an inward direction consequent upon wear occurring in the brake linings, said pawl and ratchet or equivalent mechanism being contained within the space for hydraulic fluid between the two pistons or between the piston and the end of its associated cylinder.

It is proposed that in the case of two pistons one piston shall be provided with an axial spigot formed with ratchet teeth, said spigot being axially movable within a blind boring in the opposite piston or an axial extension thereof, the pawl being located within an annular groove in the periphery of the extension, if such is provided, the pawl having one or more parts adapted to engage the ratchet teeth and as a result of the overriding effect of the pawl over the teeth provide the desired compensation, the width of the groove in the extension being sufficient to allow lateral movement of the pawl in the groove sufficient to provide the desired extent of free return inward movement between the two pistons.

By virtue of the fact that the spigot operates in a blind boring the hydraulic fluid will have access to the bottom of the boring and the end face of the spigot and to facilitate such access a bleed hole may be drilled radially through the walls of the extension near the bottom of the boring. Consequently hydraulic pressure will be applied to the pistons over the whole of their effective face areas.

It will be appreciated that by accommodating the pawl and ratchet or equivalent mechanism in the space for hydraulic fluid between the pistons, each piston carrying a seal for preventing the escape of the hydraulic fluid between the periphery of the piston and the adjacent cylinder wall, there will be no risk of the escape of hydraulic fluid from the cylinder as the latter will be effectively sealed.

Referring to the drawings

Figures 1 to 3 are longitudinal sectional views of three different forms of brake units fitted with piston assemblies in accordance with the invention:

Figure 4 is a perspective view of the preferred form of pawl:

Figure 5 is a longitudinal section of a modified construction of pawl.

The invention will be first described as applied to a construction involving a pair of opposed pistons and in a preferred embodiment of the invention the device comprises two pistons 1 which may conveniently be produced from an aluminum alloy, the one piston carrying a central spigot 2 which projects axially therefrom, the spigot being composed of steel or other comparatively hard wearing metal, the spigot being formed with annular ratchet teeth 3, each tooth being in the form of a truncated cone, the apex of each cone being directed towards the piston. The piston carrying the spigot is provided with a protuberance 4 adjacent the spigot on which is mounted a sealing washer 5 having a diameter at least equal to the diameter of the piston to make good sealing engagement with the walls of the cylinder 18. The second piston is formed with an axial extension 6 which is provided with an axial blind boring 7 into which the spigot enters. The extension 6 also provides a mounting for a second sealing washer 5a similar to the washer 5 associated with the first piston, the flanges of the sealing washers being directed inwardly towards one another to ensure a good seal under the pressure of the hydraulic fluid which enters the cylinder through a boring 8.

The extension is formed with an annular groove 9 around its periphery into which is fitted a pawl 10.

The preferred construction of pawl which is shown more clearly in Figure 4 is formed from a steel blank and includes an annular ring part 11 having two integral parallel arms 12 the extremities 13 of which are bent inwardly at right angles to engage the ratchet teeth 3 on the spigot 2. The inner edge of the part 11 enters the annular groove 9 and abuts against the inner wall thereof and to enable the pawl to be easily placed in position that part of the extension 6 on the outside of the groove is of slightly reduced diameter with or without a slight taper. A circlip 14 is then pushed over the end of the part 6 into a position in which it springs into the groove and forms a shoulder against which the pawl can abut, its movement being thus restricted to the width of the groove. The pistons and their associated parts will be maintained in the position shown by the usual coil springs (not shown) which hold the brake shoes out of engagement with the drum but on the brake pedal being depressed to force fluid into the space between the pistons the latter will be forced further apart to bring the linings into frictional engagement with the drum. As a result of this piston movement the pawl will first move into engagement with the circlip and then if wear has occurred on the faces of the linings the inwardly turned edges of the pawl will override one or more teeth on the ratchet which will have the effect of reducing the clearance between the linings and the drum when the brakes are not in operation, thus compensating for wear. The clearance between the linings and the drum will finally be determined by the width of the groove as the holding off springs associated with the shoes will once the fluid pressure is released move the pistons and shoes inwardly an amount equal to the groove's width.

A coil spring 15 is interposed between the washers 5 and 5a for the purpose of holding the washers in position and maintaining the pistons in engagement with the strut-like operating members 16 interposed between the pistons and the brake shoes 17.

In Figure 1 the cylinder 18 is fixedly mounted but in the construction shown in Figure 2 the cylinder is mounted so that it is itself capable of axial movement the hydraulic fluid acting between the single piston 1 and a transverse wall 19 in the cylinder, the latter carrying the spigot 2. The cylinder contains a dummy piston 1a. In this construction the coil spring 15 is supported at its otherwise free end by a cylindrical spring guide 20 encircling the spigot and located between two washers 21 on the spigot.

In Figure 3 a cylinder and piston assembly is shown of the kind used in connection with two leading brake shoes there being two cylinders arranged diametrically opposite one another both cylinders being fixed, each cylinder forming an anchorage for a pivotally mounted shoe. Similar reference numerals are used in this figure as in the case of Figure 2.

In Figure 5 is shown a construction of pawl wherein the two inwardly turned extremities do not lie in the same plane. Such a construction is intended to provide a finer adjustment than the previously described arrangement as only one extremity will be effective at one time. Such a modified pawl is shown in use in the construction illustrated in Figures 2 and 3. With such an arrangement one of the extremities of the pawl will enter between adjacent teeth on the spigot, whilst the other extremity will engage one of the inclined faces. The axial distance separating the extremities will be less than the width of a tooth and consequently on wear of the lining taking place the extremity which had previously entered between the teeth will ride up an incline, whilst the other extremity which had previously engaged an incline will snap over the adjacent edge and enter between adjacent teeth, thus providing a finer degree of adjustment.

In lieu of the pawl and ratchet mechanism hereinbefore described, the connecting means between the two pistons may be of any other suitable type which will permit of free or comparatively free movement in an outward direction and a locking engagement in an inward direction.

It will be appreciated that any of the piston assemblies, such as have been hereinbefore described can be easily substituted for the piston assembly as hitherto manufactured which did not incorporate self-adjusting means for compensating for wear of the brake linings.

I claim:

1. In a hydraulic brake mechanism including a brake shoe provided with a lining and capable of being hydraulically urged against a drum upon depressing of a brake pedal; actuating means for said mechanism comprising a cylinder, a piston having one end slidably mounted within said cylinder, and another end operatively connected with said brake shoe for displacement of the latter relative to said drum, said cylinder being provided with an entry for pressure fluid against said one end of said piston, a tubular axial extension on said piston, a spigot having annular ratchet teeth carried by a body within said cylinder and fitting loosely into said extension, said extension being provided with a peripheral annular groove elongated in axial direction of said piston, and a pawl comprising an annular part loosely mounted in said annular groove and a pair of parallel arms having inwardly directed ends engaging and overriding said ratchet teeth on said spigot to compensate for wear in the brake linings, the elongation of the peripheral groove permitting relative axial movement between the pawl and extension sufficient to ensure clearance of the brake shoe relative to the drum when pressure on the brake pedal is released.

2. In a hydraulic brake mechanism including a pair of brake shoes provided with linings and capable of being hydraulically urged against respective drums upon depressing of a brake pedal; actuating means for said mechanism comprising a cylinder, a pair of pistons slidably mounted within said cylinder in opposed relationship and respectively operatively connected with said brake shoes for displacement of the latter relative to their respective drums, said cylinder being provided with an entry for pressure fluid between said pistons, a tubular axial extension on one of said pistons, a spigot formed with annular ratchet teeth carried by the other piston and fitting loosely into said extension, said extension being provided with a peripheral annular groove elongated in axial direction of said one piston, and a pawl comprising an annular part loosely mounted in said annular groove and having a pair of parallel arms having inwardly directed ends engaging and overriding the ratchet teeth on said spigot to compensate for wear in the brake lining, the elongation of the perihperal groove permitting relative axial movement between the pawl and extension sufficient to ensure clearance of the brake shoes relative to the drums when pressure on the brake pedal is released.

References Cited in the file of this patent

UNITED STATES PATENTS

| | | |
|---|---|---|
| 1,668,730 | Pearson | May 8, 1928 |
| 2,559,830 | Pistoles et al. | July 10, 1951 |